(12) United States Patent
Shih et al.

(10) Patent No.: US 9,607,721 B2
(45) Date of Patent: Mar. 28, 2017

(54) METHOD OF SEPARATING AMORPHOUS IRON OXIDES

(71) Applicant: Institute of Nuclear Energy Research, Atomic Energy Council, Executive Yuan, R.O.C., Taoyuan County (TW)

(72) Inventors: Yu-Hung Shih, Taoyuan County (TW); Tung-Jen Wen, Hsinchu County (TW); Dah-Yu Kao, Taipei (TW); Yu-Te Tsai, New Taipei (TW)

(73) Assignee: INSTITUTE OF NUCLEAR ENERGY RESEARCH, ATOMIC ENERGY COUNCIL, Executive Yuan, R.O.C., Lungtan, Taoyuan (TW)

( * ) Notice: Subject to any disclaimer, the term of this patent is extended or adjusted under 35 U.S.C. 154(b) by 810 days.

(21) Appl. No.: 13/869,274

(22) Filed: Apr. 24, 2013

(65) Prior Publication Data
US 2014/0064424 A1    Mar. 6, 2014

(30) Foreign Application Priority Data

Sep. 6, 2012   (TW) .............................. 101132617 A

(51) Int. Cl.
*G21C 17/00* (2006.01)
*G21C 17/022* (2006.01)
*G21F 9/06* (2006.01)

(52) U.S. Cl.
CPC ........... *G21C 17/00* (2013.01); *G21C 17/022* (2013.01); *G21F 9/06* (2013.01)

(58) Field of Classification Search
CPC .................. G21C 19/28; G21C 19/307; G21G 2001/0094; G21F 9/007; C02F 1/66

USPC ........ 376/253, 277, 305, 306, 308, 310, 313
See application file for complete search history.

(56) References Cited

U.S. PATENT DOCUMENTS 4,978,506 A * 12/1990 Calderwood .......... G01N 17/00
                                                    210/263

OTHER PUBLICATIONS

Tsai et al., "Identification of chemical composition of CRUD depositing on fuel surface of a boiling water reactor (BWR06) plant," 2nd International Conference on Advances in Energy Engineering, Energy Procedia 14(2012), pp. 867-872.*
Tessier, et al., "Sequential Extraction Procedure for the Speciation of Particulate Trace Metals," Analytical Chemistry, 51(7), 1979, pp. 844-851.*

(Continued)

*Primary Examiner* — Jack W Keith
*Assistant Examiner* — Sharon M Davis
(74) *Attorney, Agent, or Firm* — Jackson IPG PLLC; Demian K. Jackson

(57) ABSTRACT

A method for separating amorphous iron oxides is provided. The method includes steps of sampling, filtering, dissolving and separating, analyzing the solution containing amorphous radioactive iron oxides and analyzing granules containing crystalline radioactive iron oxides. Characteristics of the radioactive iron oxides during various periods are acquired to solve the radiation buildup problem. Parameters for improving water quality and chemistry performance indicator are thus provided. Crystalline deposits are separated while the dissolving rate of radioactive iron oxides reaches more than 90%. The present invention does not use complex utilities, is easy to use and has a low operation cost for fast analysis.

5 Claims, 5 Drawing Sheets

(56) References Cited

OTHER PUBLICATIONS

Piatek et al., "Sequential Extraction Results and Mineralogy of Mine Waste and Stream Sediments Associated with Metal Mines in Vermont, Maine, and New Zealand" USGS Open-File Report 2007-1063.*

Chao and Zhou "Extraction Techniques for Selective Dissolution of Amorphous Iron Oxides from Soils and Sediments" Soil Science Society of America Journal, vol. 47, No. 2, pp. 225-232.*

* cited by examiner

METHOD OF SEPARATING AMORPHOUS IRON OXIDES

TECHNICAL FIELD OF THE INVENTION

The present invention relates to separating amorphous iron oxides; more particularly, relates to acquiring characteristics of radioactive iron oxides during various periods on operating a nuclear power plant to solve radiation buildup problem; providing parameters for improving water quality and chemistry performance indicator of the power plant; and separating crystalline deposits while the dissolving rate of radioactive iron oxides reaches more than 90%.

DESCRIPTION OF THE RELATED ART

No patents concerning separating amorphous radioactive iron oxides for nuclear power plant are found. In related documents, methods for characteristic analysis and quantitative analysis over radioactive iron oxides in a nuclear power plant are done through infrared spectrophotometer, Mössibour apparatus and X-ray diffractometer (XRD). But, most methods analyze crystalline radioactive iron oxides only and methods for amorphous ones are not available.

Toshiba Co. and Hitachi Co., Japan, use external standard methods for analysis with XRD. GE Co., USA, uses Rietveld method for analysis with Mössibour apparatus, where simulation is processed by computer for quantitative analysis. However, on judging mixing ratios of radioactive iron oxides in metal rust, accuracy is a problem.

Hence, the prior arts do not fulfill all users' requests on actual use.

SUMMARY OF THE INVENTION

The main purpose of the present invention is to acquire characteristics of radioactive iron oxides during various periods on operating a nuclear power plant to solve radiation buildup problem; to provide parameters for improving water quality and chemistry performance indicator of the power plant; and to separate crystalline deposits while the dissolving rate of radioactive iron oxides reaches more than 90%.

To achieve the above purpose, the present invention is a method of separating amorphous iron oxides, comprising steps of: (a) obtaining a water sample of corrosion product (crud); (b) filtering the water sample of corrosion product (crud) to obtain granules containing radioactive iron oxides; (c) dispersing the granules containing radioactive iron oxides through ultrasonic vibration to be added with an acid liquor to obtain a solution containing amorphous radioactive iron oxides with granules containing crystalline radioactive iron oxides and separating the solution containing amorphous radioactive iron oxides and the granules containing crystalline radioactive iron oxides through filtering; (d) processing inductively coupled plasma (ICP) quantitative analysis to the solution containing amorphous radioactive iron oxides to obtain a density of amorphous iron; and (e) processing XRD analysis to the granules containing crystalline radioactive iron oxides to obtain a weight percentage of crystalline radioactive iron oxides in each granule; dissolving the granules containing crystalline radioactive iron oxides with aqua regia (chlorazotic acid) to obtain a solution containing crystalline radioactive iron oxides; and processing ICP quantitative analysis to the solution containing crystalline radioactive iron oxides to obtain a density of crystalline iron. Accordingly, a novel method of separating amorphous iron oxides is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the block view showing the preferred embodiment according to the present invention;

DESCRIPTION OF THE PREFERRED EMBODIMENT

The following description of the preferred embodiment is provided to understand the features and the structures of the present invention.

Please refer to FIG. 1 to FIG. 5, which are a block view showing the preferred embodiment according to the present invention and views showing step (b) to step (e). As shown in the figures, the present invention is a method of separating amorphous iron oxides, comprising the following steps:

(a) Sampling 1: A water sample of corrosion product (crud) 11 is taken from at a condensate demineralizer (CD) inlet, a CD outlet or a feed water (FW) port of a nuclear power plant.

Figure 1:
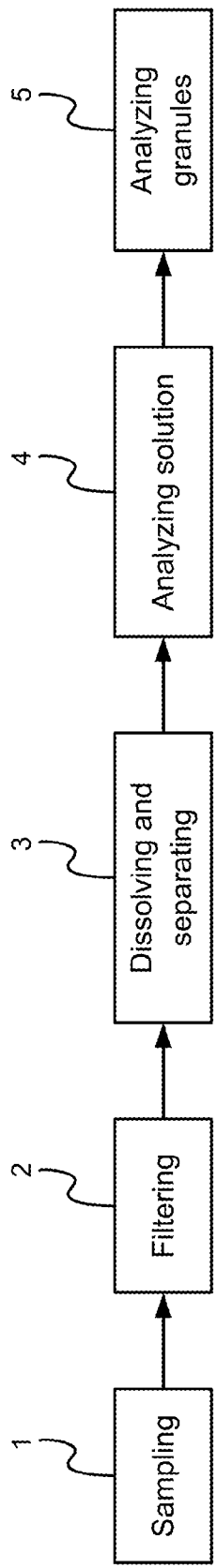
Figure 2:
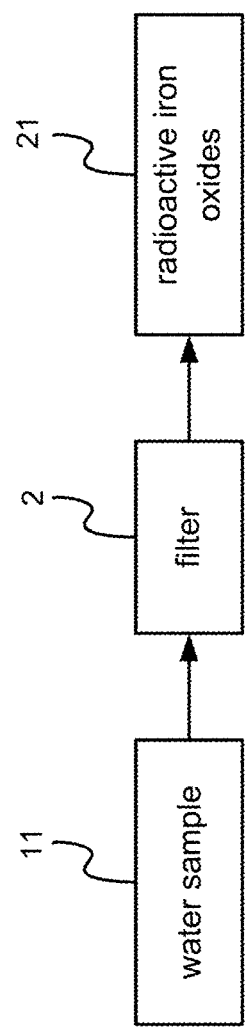
FIG. 2 is the view showing the step (b)

(b) Filtering 2: In FIG. 2, the water sample of corrosion product (crud) 11 is filtered by using a circle filtering paper and a stainless frame to obtain granules which contain radioactive iron oxides and have granular size bigger than 0.45 micrometers ($\mu m$). Therein, the circle filtering paper has pores having a size of 0.45 micrometers ($\mu m$) and has a diameter of 47 millimeters (mm).

Figure 3:
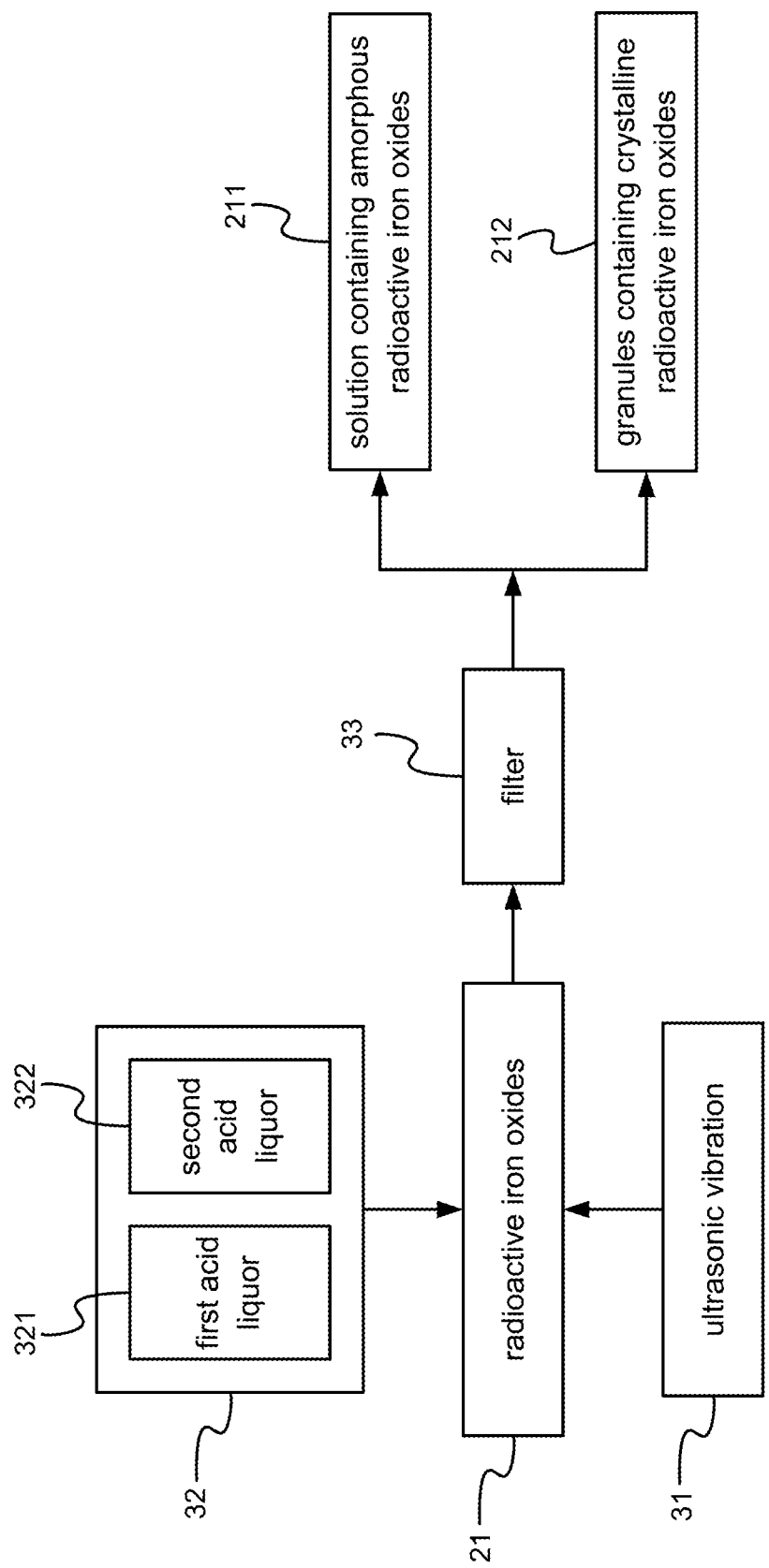
FIG. 3 is the view showing the step (c)

(c) Dissolving and separating 3: In FIG. 3, the aggregating granules 21 containing radioactive iron oxides are dispersed through ultrasonic vibration 31 to be added with an acid liquor 32 at a temperature of 40 Celsius degrees (° C.) to 100° C. for 5 to 60 minutes. Amorphous radioactive iron oxides in the granules 21 containing radioactive iron oxides is dissolved to form a solution 211 containing amorphous radioactive iron oxides. Then the granules 212 containing crystalline radioactive iron oxides are left and separated from the solution 211 containing amorphous radioactive iron oxides through filtering 33. Therein, the acid liquor 32 is formed by mixing a first acid liquor 321 and a second acid liquor 322; the first acid liquor 321 is hydrochloric acid, nitric acid, sulfuric acid, oxalic acid, acetic acid, carbonic acid or hydrofluoric acid and has a density between 0.01 M and 5M, preferred 0.05M~2M; the second acid liquor 322 is hydrochloric acid, nitric acid, sulfuric acid, oxalic acid, acetic acid, carbonic acid or hydrofluoric acid and has a density between 0.05M and 3M, preferred 0.1 M~1.5M; the first acid liquor 321 and the second acid liquor 322 have a mixing rate of 20%~99%: 1%~80%; and, the acid liquor has a pH value of pH0.01~pH2.0, preferred pH0.1~pH0.5.

Figure 4:
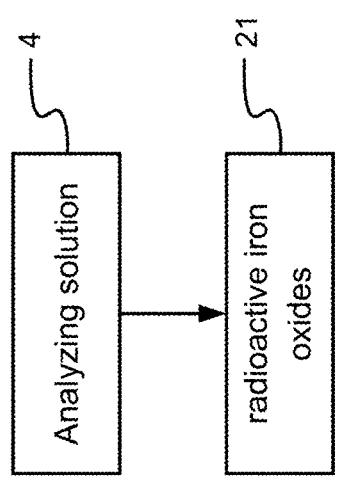
FIG. 4 is the view showing the step (d)

(d) Analyzing solution 4: In FIG. 4 inductively coupled plasma (ICP) quantitative analysis is processed to the solution 21 containing amorphous radioactive iron oxides to obtain a density of amorphous iron.

Figure 5:
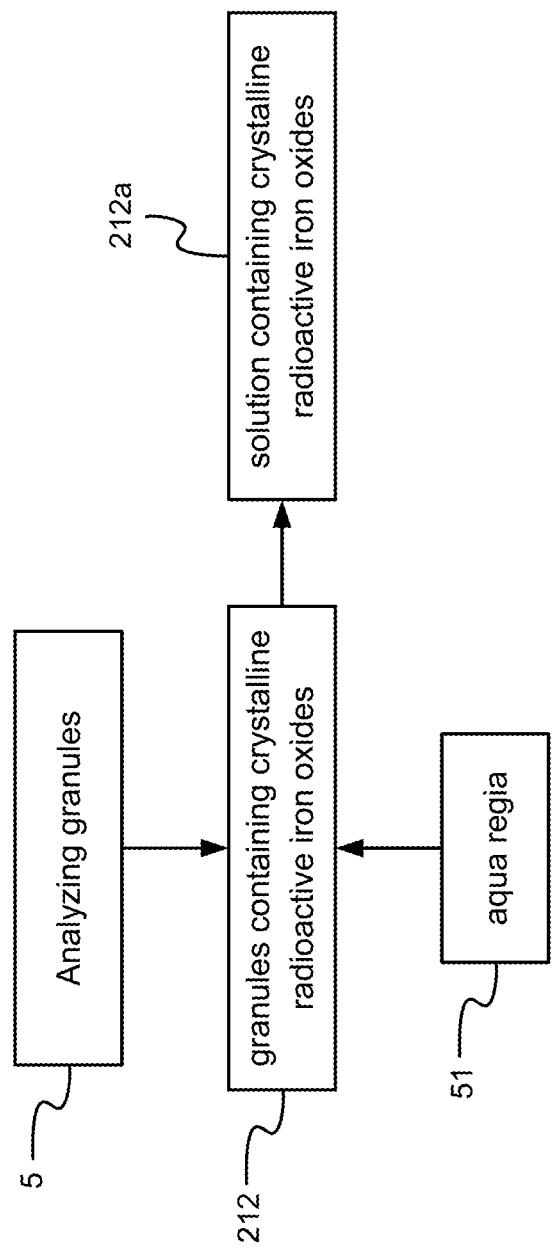
FIG. 5 is the view showing the step (e).

(e) Analyzing granules 5: In FIG. 5, X-ray diffraction (XRD) analysis is processed to the granules 212 containing crystalline radioactive iron oxides to obtain a weight percentage of crystalline radioactive iron oxides in each granule. The granules 212 containing crystalline radioactive iron oxides are dissolved with aqua regia 51 (chlorazotic acid) to obtain a solution 212a containing crystalline radioactive iron oxides. Then, ICP quantitative analysis is processed to the solution 212a containing crystalline radioactive iron oxides to obtain a density of crystalline iron.

Through the above steps, the present invention analyzes corrosion product (crud) of a nuclear or thermal power plant and does so for related studies on various radioactive iron oxides. For example, the studies on crystalline radioactive iron oxides, like $\alpha$-FeOOH, $\beta$-FeOOH, $\gamma$-FeOOH, $\delta$-FeOOH, $\alpha$-Fe$_2$O$_3$, $\gamma$-Fe$_2$O$_3$, Fe$_3$O$_4$, etc.; and on amorphous radioactive iron oxides, like Fe(OH)$_3$, Fe(OH)$_2$, etc.

To sum up, the present invention is a method of separating amorphous iron oxides, where characteristics of radioactive iron oxides during various periods on operating a nuclear power plant are acquired to solve radiation buildup problem; parameters for improving water quality and chemical indicator performance of the power plant are thus provided; crystalline deposits are separated while the dissolving rate of radioactive iron oxides reaches more than 90%; and the present invention does not use complex utilities, is easy to use and has a low operation cost for fast analysis.

What is claimed is:

1. A method of separating amorphous iron oxides from a sample of nuclear reactor corrosion products, comprising the steps of:
    (a) obtaining a water sample containing the corrosion products from the nuclear reactor coolant loop;
    (b) filtering said water sample containing corrosion products to separate granules containing radioactive iron oxides from the water;
    (c) applying ultrasonic vibration and an acid liquor mixture comprising a first acid liquor selected from a group consisting of nitric acid, sulfuric acid, carbonic acid and hydrofluoric acid and having a concentration between 0.01 M and 5M and a second acid liquor selected from a group consisting of nitric acid, sulfuric acid, carbonic acid and hydrofluoric acid and having a concentration between 0.05M and 3M to the granules containing radioactive iron oxides to obtain a solution containing amorphous radioactive iron oxides and undissolved crystalline radioactive iron oxides and then separating said solution from the granules containing crystalline radioactive iron oxides by filtering;
    (d) quantitatively analyzing the solution with amorphous radioactive iron oxides with inductively coupled plasma (ICP) to obtain a concentration of amorphous iron oxides in the solution;
    (e) quantitatively analyzing the granules containing crystalline radioactive iron oxides with X-ray diffraction (XRD) to obtain a weight percentage of crystalline radioactive iron oxides in each granule; and
    (f) dissolving said granules containing crystalline radioactive iron oxides with aqua regia to obtain a solution containing crystalline radioactive iron oxides and quantitatively analyzing the solution containing crystalline radioactive iron oxides with ICP quantitative analysis to obtain a concentration of crystalline iron oxides in the solution, wherein said granules containing crystalline radioactive iron oxides have granular sizes bigger than 0.45 micrometer ($\mu$m); and wherein said acid liquor mixture and said aqua regia have concentrations between 0.01M and 5M.

2. The method according to claim 1, wherein, in step (a), said water sample is obtained at a port selected from a group consisting of a condensate demineralizer (CD) inlet, a CD outlet and a feed water (FW) port.

3. The method according to claim 1, wherein said first acid liquor and said second acid liquor are mixed at a ratio of 20%~99%:1%~80%.

4. The method according to claim 1, wherein said acid liquor mixture has a pH value of pH0.01 to pH2.0.

5. The method according to claim 1, wherein, in step (c), said acid liquor mixture is added at a temperature of 40 Celsius degrees (° C.) to 100° C. for 5 to 60 minutes.

\* \* \* \* \*